(12) United States Patent
Georgeaux et al.

(10) Patent No.: US 7,653,016 B2
(45) Date of Patent: Jan. 26, 2010

(54) METHOD OF CONTROLLING ACCESS TO RESOURCES OF A RADIOCOMMUNICATION NETWORK AND BASE STATION FOR IMPLEMENTING THE METHOD

(75) Inventors: Eric Georgeaux, Montigny le Bretonneux (FR); Denis Fauconnier, Saint-Remy les Chevreuse (FR)

(73) Assignee: Alcatel Lucent, Paris (FR)

( * ) Notice: Subject to any disclaimer, the term of this patent is extended or adjusted under 35 U.S.C. 154(b) by 1003 days.

(21) Appl. No.: 10/875,823

(22) Filed: Jun. 24, 2004

(65) Prior Publication Data
US 2005/0026622 A1 Feb. 3, 2005

(30) Foreign Application Priority Data
Jun. 24, 2003 (FR) .................................. 03 07609

(51) Int. Cl.
*G08C 17/00* (2006.01)
(52) U.S. Cl. .................... 370/311; 370/342; 370/441
(58) Field of Classification Search ................ 370/230, 370/235, 315, 320, 328, 331–333, 335, 342, 370/437, 441, 443, 447, 311
See application file for complete search history.

(56) References Cited

U.S. PATENT DOCUMENTS

| 5,710,982 | A * | 1/1998 | Laborde et al. ................ 455/69 |
| 5,884,165 | A * | 3/1999 | Uchida et al. ............. 455/426.1 |
| 6,760,311 | B1 * | 7/2004 | Raith .......................... 370/252 |
| 7,277,407 | B2 * | 10/2007 | Kim et al. .................... 370/328 |
| 2003/0109274 | A1 * | 6/2003 | Budka et al. ................. 455/522 |
| 2003/0210668 | A1 * | 11/2003 | Malladi et al. .............. 370/335 |
| 2004/0004944 | A1 * | 1/2004 | Petrus et al. ................ 370/318 |
| 2004/0109422 | A1 * | 6/2004 | Naito .......................... 370/328 |
| 2004/0147242 | A1 * | 7/2004 | Pasanen et al. .............. 455/403 |
| 2004/0184416 | A1 * | 9/2004 | Woo ........................... 370/318 |
| 2004/0218567 | A1 * | 11/2004 | Budka et al. ................. 370/332 |

FOREIGN PATENT DOCUMENTS

EP 1 119 118 7/2001

(Continued)

OTHER PUBLICATIONS

3GPP TS 22.011 V3.7.0 (Mar. 2002) pp. 1-14, XP002273238.

(Continued)

*Primary Examiner*—Donald L Mills
(74) *Attorney, Agent, or Firm*—Sughrue Mion, PLLC (57) ABSTRACT

A radio terminal is organized to send a first access signal then, when it receives a positive acknowledgement from a base station, a second access signal, resources of the communication network being allocated to the radio terminal after receipt of the said second access signal at the base station. At a base station, the first access signal sent by a radio terminal is received and the communication service requested by the terminal is detected therein. In conditional manner, depending on the detected communication service, a receive power of the first access signal is measured, the measured receive power is compared with a threshold, and the transmission of a positive acknowledgement of the first access signal to the radio terminal is inhibited, when the measured receive power is greater than the said threshold.

20 Claims, 2 Drawing Sheets

FOREIGN PATENT DOCUMENTS

| | | |
|---|---|---|
| GB | 2 355 887 | 5/2001 |
| WO | WO 99/65158 | 12/1999 |
| WO | WO 01 43296 | 6/2001 |
| WO | WO 02 098017 | 12/2002 |

OTHER PUBLICATIONS

TS 25.401, version 3.3.0, published in Jun. 2000 by the 3GPP ("3rd Generation Partnership Project"), pp. 20-21.

TS 25.101, version 3.6.0, published in Mar. 2001 by the 3GPP, section 6.4.3, p. 13.

TS 25.214, version 5.4.0, published by the 3GPP in Mar. 2003, section 6.1.

TS 25.331, version 3.9.0, published in Dec. 2001 by the 3GPP, section 9.

TS 25.304, version 3.6.0 published in Mar. 2001 by the 3GPP, section 5.2.

TS 25.211, version 3.3.0, published in Jun. 2000 by the 3GPP, section 5.3.3.1.

TS 25.321, version 3.4.0, published in Jun. 2000 by the 3GPP, section 11.2.2.

TS 25.215, version 3.3.0, published in Jun. 2000 by the 3GPP, section 5.1.1.

TS 25.213, version 3.7.0, published in Dec. 2001 by the 3GPP.

TS 22.011, version V3.7.0, published in Mar. 2002 by the 3GPP in paragraph 4 (p. 11 and 12).

\* cited by examiner

METHOD OF CONTROLLING ACCESS TO RESOURCES OF A RADIOCOMMUNICATION NETWORK AND BASE STATION FOR IMPLEMENTING THE METHOD

BACKGROUND OF THE INVENTION

The present invention relates to radiocommunications with mobiles, and more particularly the methods of controlling access by mobile terminals to resources of a radiocommunication network.

Many radiocommunication systems use methods of controlling transmit power in order to reduce the level of interference between the various communications. This power control has a particular importance in spread spectrum systems using Code Division Multiple Access (CDMA). In these systems, several terminals can share the same frequency at every moment, the separation of the channels on the radio interface resulting from the quasi-orthogonality of the spread codes respectively applied to the signals sent over those channels. In other terms, for a given channel, the contributions of the other channels are seen as noise.

In particular, on the uplink, transmit power control limits the transmit power of the mobiles close to a base station to prevent the signals that they send masking the signals originating from more distant mobiles. In general, the power control methods use loop power control: the base station takes measurements on the signal received from a mobile (power, signal-to-interferer ratio (C/I), etc.), and transmits commands to increase or reduce power on the downlink in order to tend towards a given quality objective. These methods cannot be used before a radio link is established between the base station and the mobile. In particular, they do not allow idle mobiles to determine the level of power at which they must send any random access requests.

For UMTS ("Universal Mobile Telecommunications System") systems, the transmit loop power controls on the uplink are described in technical specification 3G TS 25.401, version 3.3.0, published in June 2000 by the 3GPP ("3rd Generation Partnership Project"), pages 20-21.

For the power of the first signals sent by a mobile terminal to a base station, particularly for a new communication, these loop power controls are not operational, because the base station has not received the previous signal from the mobile terminal allowing it to take the required measurements. The mobile terminal then estimates the power of these first signals according to another procedure based on the attenuation of the signals sent by the base station and received by the mobile terminal. The base station broadcasts a beacon signal indicating the power at which it has sent it. The receipt of these beacon signals allows the idle mobile to determine the resources used by the base station with which the link is the best (cell selection) and to evaluate the attenuation of the signal from that station. From this it deduces an initial power for transmission of the radio signals to the selected base station, the power equalling the degree of attenuation.

In certain circumstances, particularly when the mobile terminal is very close to the receive antenna of the base station, the result of this estimate may be a very low transmit power. Such is the case for example of a call from a maintenance agent working on the base station itself and using his radio terminal.

Now a radio terminal, due to its construction, has a minimal radio transmit power below which it is not capable of transmitting. Technical specification 3G TS 25.101, version 3.6.0, published in March 2001 by the 3GPP, recommends a minimal transmit power by UMTS mobile terminals of −50 dBm (section 6.4.3, page 13).

If the transmit power estimated for the random access request is below this minimal power, the mobile terminal sends the random access request with its minimal transmit power (see technical specification 3G TS 25.214, version 5.4.0, published by the 3GPP in March 2003, section 6.1).

If this transmit power is clearly greater than the power estimated from the attenuation measurements, this transmission risks generating significant noise for the other radio signals received by the base station and therefore damaging the quality of transmission of the communications in progress to which these other signals belong.

To limit this effect, WO 99/65158 proposes that, when a mobile terminal is too close to a base station, this base station transmits a "first command" to the said mobile terminal, making it enter a degraded operation mode, in order to prevent that terminal harming the communications of other mobile terminals. This "first command" may in particular be generated after an access request and be transmitted instead of the channel allocation. The effect of this command may be to inhibit or delay the establishment of a link between the mobile terminal and the base station in question.

This solution inhibits the procedure of establishing a communication. This inhibition is performed systematically when the mobile terminal is considered too close to the base station, without consideration of the type of service envisaged.

In particular, if the mobile terminal requests a specific communication service while being close to a base station, for example if it attempts to make an emergency call, this call risks being impossible due to it being inhibited during the establishment procedure. Now, for obvious reasons, it is desirable that certain communications such as emergency calls can be made in all circumstances.

WO 02/098017 proposes to inhibit the transmission of network access signals by a mobile terminal when the difference between its minimal transmit power and the estimated initial transmit power exceeds a predefined threshold, that is to say when the mobile terminal is too close to a base station of the access network. This manner of proceeding can be used to deal easily with the problem of emergency calls since the terminal can itself override the inhibition of the access signals when it knows that it is in the process of requesting an emergency call. But since this solution is not standardized, it will in practice be applied only by a small proportion of the population of terminals in circulation. Now the inhibition of network access requests from a terminal too close to a base station essentially benefits the other terminals situated in the cell, which suffer less interference. This observation is of the type that restrains recourse to this type of precaution, despite its value for the network user community.

An object of the present invention is to restrict these disadvantages in particular by avoiding systematically inhibiting all call attempts without distinction for a mobile terminal too close to a base station of an access network, and to do this without counting on the mobile terminal itself.

SUMMARY OF THE INVENTION

Thus the invention proposes a method of controlling access of at least one radio terminal to resources of a radiocommunication network to implement a communication service, the radiocommunication network comprising at least one base station. The radio terminal is organized to send a first access signal then, when it receives a positive acknowledgement of the first access signal from a base station, a second access signal substantially longer than the said first access signal, resources of the communication network being allocated to the radio terminal after receipt of the said second access signal at the base station. The method comprises the following steps:

/a/ receiving at a base station the first access signal sent by a radio terminal;

/b/ detecting, from the first access signal, a communication service requested by the radio terminal;

and at least some of the following steps, in conditional manner, according to the communication service detected:

/c/ measuring a receive power of the first access signal;

/d/ comparing the measured receive power with a threshold; and

/e/ inhibiting the transmission of a positive acknowledgement of the first access signal to the radio terminal, when the measured receive power is greater than the said threshold.

Such a method thus makes it possible to restrict the access attempts of terminals too close to a base station to a single transmission of a signal of short duration, for example the preamble of an access signal. only the terminals sufficiently distant from the base station, and therefore not likely to generate interference harmful to other communications, may continue their access attempt by transmitting the second and main access signal to the network. Specifically, the receive power of the first access signal gives a pertinent indication of the distance between the radio terminal and the base station in question.

In addition, the processing of the access signals differs depending on the communication service requested, so that the indication relating to the distance separating the radio terminal and the base station is not taken into account for certain types of calls. In particular, emergency calls may not be subject to a discrimination measure as a function of the distance.

The distinction between the communication services may be made by using partitions of a random access channel, which may take the form for example of a subchannel, that is to say a time-related selection of the random access channel and/or a signature contained in the first access signal. The correspondence between partitions of the random access channel and communication services may advantageously be deduced from information broadcast by the base station.

The invention also proposes a base station of a radiocommunication network, comprising means for receiving and positively acknowledging a first access signal from a radio terminal requesting a communication service, and means for receiving a second access signal substantially longer than the said first access signal, resources of the communication network being allocated to the radio terminal after receipt of the said second access signal at the base station. The base station also comprises:

/a/ means for detecting, based on a first access signal received from a radio terminal, a communication service requested by the radio terminal;

/b/ means for measuring a receive power of the first access signal;

/c/ means for comparing the measured receive power with a threshold; and

/d/ means for inhibiting the transmission of a positive acknowledgement of the first access signal to the radio terminal, when the measured receive power is greater than the said threshold.

At least some of the means /b/, /c/, /d/ are implemented, in conditional manner, according to the communication service detected by the means /a/.

DESCRIPTION OF PREFERRED EMBODIMENTS

The invention is described here in its application to the radio access network of a cellular system of the UMTS type. This access network, called UTRAN ("UMTS Terrestrial Radio Access Network") uses the CDMA technique. It comprises radio network controllers 5 called RNC which, via an interface Iub, drive network nodes called "node B". Each node B comprises one or more base stations 1 each serving one or more cells. These base stations communicate by radio with mobile terminals 2, 3 called UE ("User Equipment") via an interface Uu (see technical specification 3G TS 25.401, version 3.3.0).

Figure 1:
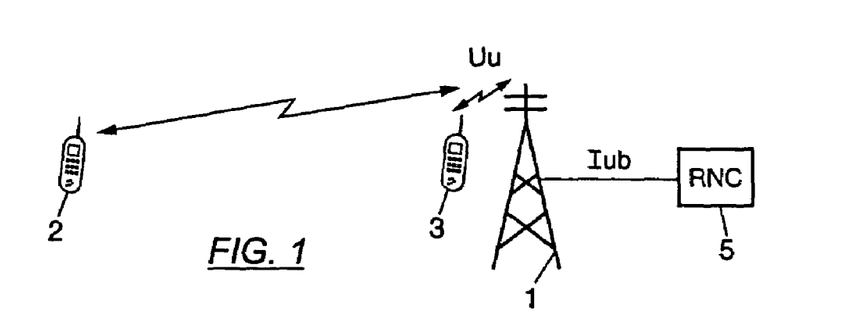
FIG. 1 represents two mobile terminals connected to a base station of a radiocommunication system.

The mobile terminals may be relatively far from the base station or extremely close such as the mobile terminal 3 shown in FIG. 1.

Each UE 2, 3 may be in several states of connection with the UTRAN, managed by a radio resource control protocol (RRC) implemented at the RNC and at the UE (see technical specification 3G TS 25.331, version 3.9.0, published in December 2001 by the 3GPP, section 9). In some of these states, the UE is actively connected to the radiocommunication system, that is to say in particular that it can send to the base station radio signals relating to a communication in progress. In these states, the loop power controls of the transmit power by the UE are operational.

When the UE is powered up and in a selected cell without having any communication in progress with the UTRAN, it is in an idle state. The processes of initial selection and reselection of the cell are described in technical specification 3G TS 25.304, version 3.6.0 published in March 2001 by the 3GPP, section 5.2. In this idle state, after having selected a cell, the UE receives system information sent over a broadcast channel (BCH) by the base station of the selected cell (see technical specification 3G TS 25.331, version 3.9.0, section 8.1.1).

This system information includes, amongst other things:

the power of transmission ("Primary CPICH DL TX power", in dBm) by the base station of a beacon signal on a primary pilot channel called the CPICH ("Common Pilot Channel") (see technical specification 3G TS 25.331, version 3.9.0). The UE is capable, by subtracting the receive power of the CPICH (CPICH_RSCP) from this transmit power, of estimating the attenuation experienced on the propagation channel;

two parameters called "UL interference" and "Constant Value" involved in the computation of an initial power of transmission by the UE (see technical specification 3G TS 25.331, version 3.9.0).

Figure 2:
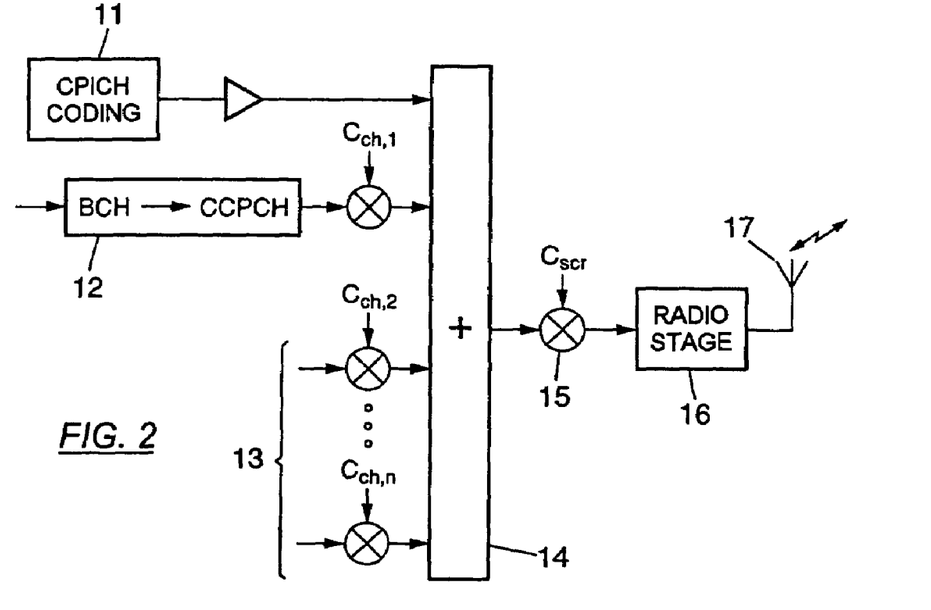
FIGS. 2 and 3 are partial block diagrams of a base station and a mobile terminal respectively.

FIG. 2 illustrates schematically the transmit portion of the base station 1. The data of the CPICH (see technical specification 3G TS 25.211, version 3.3.0, published in June 2000 by the 3GPP, section 5.3.3.1) are produced by a module 11 and amplified according to the transmit power, "Primary CPICH DL TX power", specified by the RNC. The module 12 inserts the control information to be broadcast over the BCH in the physical channel intended to receive it, called P-CCPCH ("Primary Common Control Physical Channel", see technical specification 3G TS 25.211, version 3.3.0, section 5.3.3.2) and applies the corresponding codings. This control information, received from the RNC on the BCH transport channel, comprises in particular the abovementioned system information. In general, the CPICH has a "channelization" code equal to 1, such that it is added directly to the contributions of the other channels multiplied by their respective "channelization" codes $c_{ch,1}$, $c_{ch,2}$, ..., $c_{ch,n}$. Amongst these other channels, there are the various dedicated channels 13 active in the cell.

The summed signal delivered by the adder 14 is multiplied by the scrambling code $C_{scr}$ of the cell, applied to the multiplier 15. The output from this multiplier 15 is connected to the radio stage 16 of the station which generates the radio signal transmitted by the antenna 17.

To initialize a communication, or more generally to transmit information to the UTRAN in idle mode, the UE transmits to the selected base station a random access request signal on a common channel called the PRACH ("Physical Random Access Channel").

This random access procedure is executed by the physical layer (see technical specification 3G TS 25.214, version 5.4.0, section 6), under the control of the medium access control layer MAC (see technical specification 3G TS 25.321, version 3.4.0, published in June 2000 by the 3GPP, section 11.2.2) and of the RRC layer. The instances of the MAC and RRC protocols executed in the UE are respectively illustrated by the modules 19 and 20 in FIG. 3.

Figure 3:
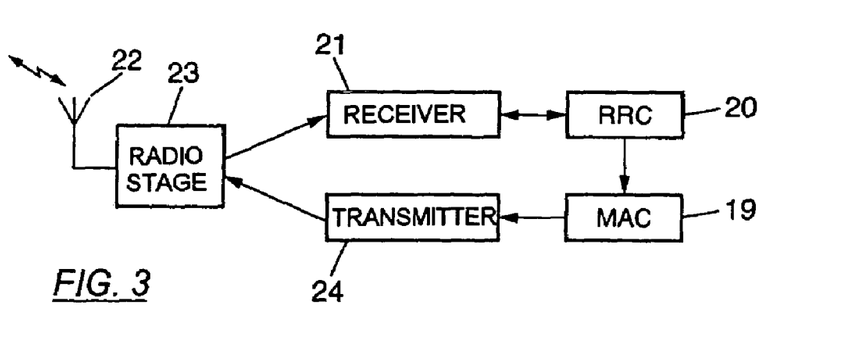

The module 20 processes the system information decoded on the CCPCH by the receive portion 21 of the UE based on the radio signal captured by the antenna 22 and processed by the radio stage 23. The receiver 21 also measures the receive power on the CPICH (parameter CPICH_RSCP according to technical specification 3G TS 25.215, version 3.3.0, published in June 2000 by the 3GPP, section 5.1.1), expressed in dBm.

Prior to the transmission of the random access request, the RRC module 20 of the UE estimates a transmit power $P_I$ of this request ("Preamble_Initial_Power"), on the basis of the last measurement of the receive power CPICH_RSCP and of the transmit power of the base station on the CPICH as indicated in the broadcast system information. This estimate is made as indicated in technical specification 3G TS 25.331, version 3.9.0, section 8.5.7:

$$P_I = \text{Preamble\_Initial\_Power}$$
$$= \text{Primary } CPICH\ DL\ TX \text{ power} - \text{CPICH\_RSCP} +$$
$$UL \text{ interference} + \text{Constant Value}$$

The recommended accuracy for this determination is ±9 dB to ±12 dB (technical specification 3G TS 25.101, version 3.6.0, page 12). For a UE 3 very close to the base station 1, this calculated transmit power value $P_I$ may be for example of the order of −70 dBm.

Because of the characteristics of the radio portion 23 of the UE, the latter can transmit properly formatted radio signals only beyond a determined minimal power $P_{min}$ (for example −50 dBm).

When $P_I < P_{min}$, the transmission portion 24 of the UE transmits the random access request on the PRACH channel with the power $P_{min}$.

Figure 4:
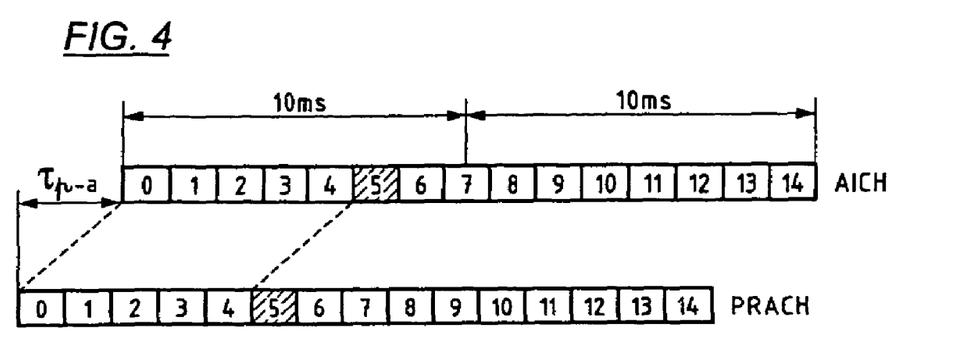
FIG. 4 is a diagram illustrating the frame structure employed for the RACH and AICH physical channels in the UMTS system in FDD ("Frequency Division Duplex") mode.

The random access procedure is described in greater. detail below. FIG. 4 gives a schematic representation of the structure used for the PRACH channel. The latter comprises a repeated pattern of two sets of access slots: the first comprising the access slots numbered from 0 to 7 and the second the access slots numbered from 8 to 14. The two successive sets of access slots have a total duration of 2×10 ms or 20 ms.

Furthermore, RACH subchannels are defined amongst the 15 access slots of the PRACH channel, on a basis of 12 access slots. The subchannel RACH i, where i is an integer between 0 and 11, consists in the corresponding uplink access slot of index i, and every 12th access slot following this slot, that is to say the access slots of index i+12. k modulo 15, where k is an integer (see technical specification 3G TS 25.214, version 5.4.0, published by the 3GPP in March 2003, section 6.1).

A random access request is made consisting of two distinct signals which may be seen as two portions of one and the same access signal: a preamble and an access message (main portion of the signal), the latter being substantially larger than the preamble and therefore a longer transmission duration than that of the preamble (10 ms or 20 ms). The preamble comprises 256 repetitions of a code called the signature and denoted $P_s(n)$, where n is an integer between 0 and 15. The signatures $P_s(n)$ are Hadamard codes of 16 chips in length. The formulation of these codes may be found in section 4.3.3 of technical specification TS 25.213, version 3.7.0, published in December 2001 by the 3GPP.

A random access request is therefore made by transmitting a signal corresponding to the preamble on one subchannel i of the PRACH channel (out of the 12 possible subchannels), denoted sc(i), and by using a signature $P_s(n)$ (out of the 16 possible signature codes). These access parameters may be the subject of one pair of parameters characteristic of random access, out of all the possible pairs: (sc(i); $P_s(n)$), where $0 \leq i \leq 11$ and $0 \leq n \leq 15$, where i designates an RACH subchannel number and n a preamble signature index. Such a pair may be considered as one partition out of all the partitions constituting the PRACH channel.

Furthermore, access service classes or ASC are defined in the UMTS system. Each ASC class corresponds to a set of partitions of the PRACH channel, that is to say of pairs (sc(i); $P_s(n)$) as defined above, where i is between a minimal value and a maximal value, within the limits indicated above. A cross-check is possible between the partitions of the PRACH and ASC classes such that one and the same pair (sc(i); $P_s(n)$) may correspond to several distinct ASC classes. It is assumed hereafter that there is at least one set of at least one pair (sc(i); $P_s(n)$) where $i_{min,\theta} \leq i \leq i_{max,\theta}$ and $n_{min,\theta} \leq n \leq n_{max,\theta}$, such that this set corresponds only with a single access service class, denoted ASC($\theta$).

Any random access procedure on the physical layer is initiated at the request of the MAC layer. It can be made only if the physical layer has received from the RRM layer a set of available signatures and the RACH subchannels available for each ASC class.

In addition, the UMTS system comprises access classes which can be used to distinguish types of calls. These access classes are described in detail in 3GPP specification TS 22.011, version V3.7.0, paragraph 4 (p. 11 and 12). Sixteen access classes, numbered from 0 to 15, are defined in the UMTS standard.

The standard access classes (AC), numbered from 0 to 9, correspond to the standard calls and are allocated to all the subscribers in order to obtain a uniform random distribution. Each subscriber is therefore assigned a standard access class, which is stored in his subscriber identity module, called the SIM/USIM module ("Universal Subscriber Identity Module"), which may where necessary be a card that is inserted in the terminal.

In addition to this standard access class, certain subscribers have one or more access classes from the five access classes numbered from 11 to 15. Access class number 10 is, for its part, reserved for emergency calls.

Furthermore, there is a correspondence, specific to each cell, between the ASC classes and the AC access classes (see paragraph 8.5.13 of 3GPP specification TS 25.331, version V3.9.0 published in December 2001 by the 3GPP). In the UMTS system, a single ASC class may be placed in correspondence with the standard access classes, while the other AC access classes may be placed individually in correspondence with an ASC class.

In the rest of the description, it will be assumed that the class ASC(θ) is placed only in correspondence with a given access class. In an advantageous embodiment, this AC access class will be access class 10, reserved for emergency calls.

As mentioned above, when the UE is in the idle mode, after having selected a cell, it receives system information transmitted on the BCH transmission channel by the base station covering the selected cell. This system information comprises, in addition to the abovementioned parameters, uplink access control information and information relating to the random access procedure on the physical layer.

The uplink access control information comprises the AC access classes for which random access is authorized. The information relating to the random access procedure on the physical layer identifies the access slots and the signatures that it is allowed to use. This system information also includes the correspondence between the AC access classes and ASC classes for the cell.

Furthermore, the random access procedure on the physical layer allows for the transmission by the UTRAN of an indicator of acknowledgement ("AI—Acquisition Indicator") of the RACH preamble signature, sent by a mobile terminal. This acknowledgement is transmitted over the downlink common physical channel AICH ("Acquisition Indicator Channel"). It has a structure similar to that of the RACH preamble, since it uses a spread factor equal to 256 and a 16 chip sequence signature. The acknowledgement of the random access may be positive or negative. In one embodiment, an acknowledgement on the AICH channel using a signature identical to the RACH preamble signature is positive, whereas an acknowledgement using a signature inverted relative to the RACH preamble signature is negative.

The AICH channel is, like the RACH subchannels, structured according to a pattern comprising 15 successive time slots, repeated every 20 ms, as illustrated in FIG. 4. It is synchronized on a primary pilot channel P-CPICH ("Primary Common Pilot Channel") on which each base station of the node B concerned transmits a beacon signal (see technical specification 3G TS 25.211, published by the 3GPP, version 3.9.0, section 7). The P-CPICH channel serves specifically as a reference in phase with other physical channels, like the AICH channel. It is distinguished by a unique standardized "channelization" code (see technical specification 3G TS 25.213 published by the 3GPP, version 3.9.0, section 5.2).

The downlink transmission of the acknowledgement may be initiated only at the beginning of the AICH access slot offset by $\tau_{p-a}$ chips ($\tau_{p-a}$ being a number determined as a function of the length of the message that follows the preamble) relative to the beginning of the access slot used for the uplink transmission of the random access preamble. This offset is illustrated in FIG. 4: the random access preamble is transmitted in access slot number 5 of the current frame of the PRACH uplink channel, whereas the acknowledgement is transmitted in the same numbered access slot (5) in the current frame of the downlink AICH channel. The two consecutive transmissions, indicated by the cross-hatching in FIG. 4, are offset in time by $\tau_{p-a}$ chips.

Before making a random access to the base station 1, a UE 2, 3 takes account of the system information broadcast by the network. By taking this information into account, it can determine and store the correspondence between AC access classes and ASC access service classes specific to each cell of the access network (see technical specification 3G TS 25.331 published by the 3GPP, version 3.9.0, sections 10.3.6.55 and 10.3.6.1). The mobile terminal in particular stores a correspondence between the AC access class 10 reserved for emergency calls and an ASC class. This correspondence can be updated in the memory of the terminal if modifications appear in the information broadcast by the network.

The UE then selects an ASC class according to the authorized access class that it is using for the call. During a standard call, the ASC class thus selected will be that which corresponds to the standard access classes (AC access classes from 0 to 9).

As previously indicated, one or more authorized subsets of pairs $\{(sc(i); P_s(n))/i_{min,k} \leq i \leq i_{max,k}$ and $n_{min,k} \leq n \leq n_{max,k}\}$ of the RACH set of resources will correspond to the class ASC (k) thus selected. The random access attempt by the UE will therefore use resources of that set.

On receipt of the access request, on the resources thus defined, the base station 1 finds the AC access class used for the service to be implemented, by dint of the correspondences established between, on the one hand, the random access resources and the ASC classes and, on the other hand, the ASC classes and the access classes and, provided that at least some of the correspondences between the elements are one-to-one.

During an emergency call, the emergency access class will be used and the class ASC(θ) will be selected by the UE 2, 3. The corresponding random access will not be able to be made without using the resources of the subset θ of pairs $\{(sc(i); P_s(n))/i_{min,\theta} \leq i \leq i_{max,\theta}$ and $n_{min,\theta} \leq n \leq n_{max,\theta}\}$. The base station 1 will receive the random access request and will be capable of recognizing the use of the subset θ of resource pairs, hence the selection of the class ASC (θ) and consequently the use of the emergency calls access class.

In another embodiment, the assignment of the classes and the correspondence between the access resources on the one hand and the access classes and the access service classes on the other hand can be made such that the use of the access resources may allow the non-equivocal definition of types of communication services other than emergency calls, for example voice calls, data transmissions, etc.

Furthermore, when the base station 1 receives a random access request on a partition of the PRACH channel, it is capable of calculating, in conventional manner, the receive power of the received signal corresponding to the preamble transmitted by a UE. It then compares this transmit power with a threshold, predetermined where necessary, to determine whether the UE in question is or is not too close to the base station. Specifically, the access signal sent by the UE 3 close to the base station 1 will have a receive power close to the transmit power $P_f$ of that signal, as mentioned above, since signal attenuation will be low on the short path to be covered by the corresponding radio waves. On the other hand, a UE 2 further away from the base station 1 will see the transmit power $P_f$ of the signal carrying its RACH preamble greatly attenuated on receipt of the signal by the base station 1. Thus, an adequate adjustment of the power threshold can be used to dissociate with a greater or lesser degree of severity the mobile terminals considered to be too close to the base station.

When the UE attempting to access the network is considered to be too close to the base station (for example the UE 2, relative to the base station 1), the latter then inhibits the transmission of a positive acknowledgement of the preamble sent by the UE on the AICH channel. This inhibition may consist in the transmission of a negative acknowledgement on the appropriate AICH resources (as described above).

Such an inhibition has the effect of stopping the random access procedure at this stage. The access message constituting the second, and larger, portion of the random access request will then not be sent by the UE in question, thus avoiding generating an interference prejudicial to the communications in progress, particularly with the said base station. The interference is specifically limited to the noise generated by the transmission of a preamble, which may be considered weak in comparison with that which would be generated by the transmission of the access message which is larger in size than the preamble.

Figure 5:
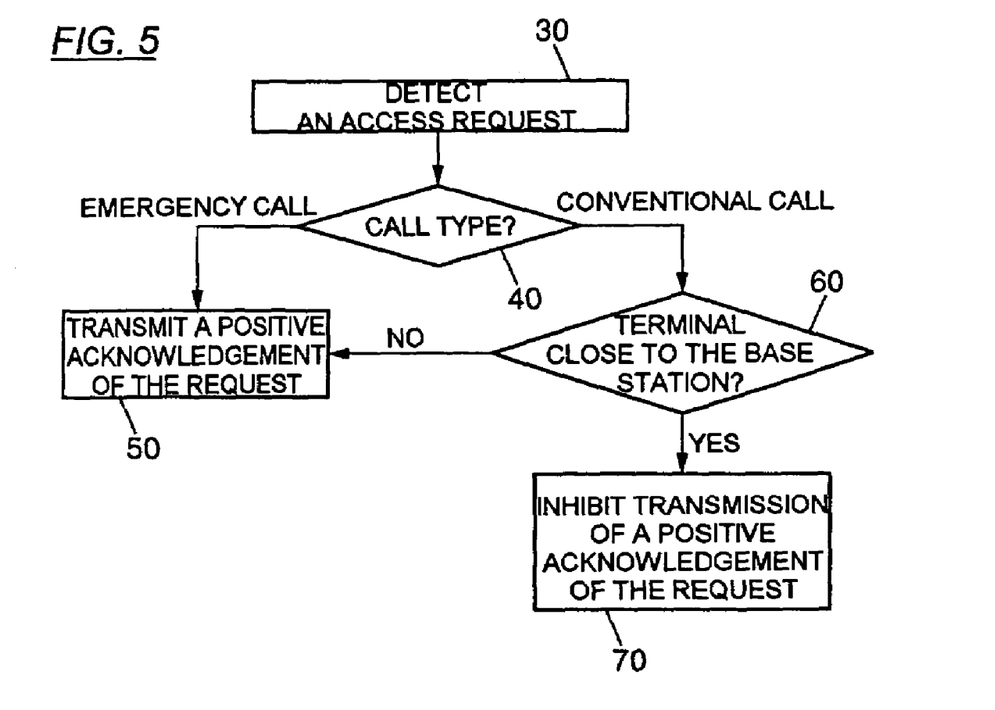
FIG. 5 is a flowchart illustrating schematically the steps used in one embodiment of the invention.

According to the invention and as illustrated in FIG. 5, a base station, after having detected an access request (step 30), first determines the communication service that the UE is requesting. As described above, this step may advantageously consist in determining whether the requested communication is a conventional call or an emergency call (step 40).

If it is a conventional call, it is determined whether the UE having sent the random access preamble may be considered to be too close to the base station (step 60), for example based on the result of a comparison between the receive power of the signal carrying the preamble and a threshold, as indicated above. If it is in the affirmative, the transmission of a positive acknowledgement of the preamble will be inhibited (step 70) for example according to the embodiment described above, whereas this transmission will take place if the UE is not considered to be too close to the base station (step 50).

Such a choice is not open when the base station has detected that the access attempt concerned an emergency call, for example according to the embodiment described above. In this case specifically, there is no search to ascertain whether the UE is close to the base station in question, that is to say whether the associated access request is likely to generate interference, so that the emergency call can be established in all cases. Thus, a positive acknowledgement of the preamble will be transmitted to the UE attempting access, even though the latter is particularly close to the base station (step 50). A signal carrying the access request message following transmission of the preamble will then be transmitted by the UE to the base station and the access procedure will be carried out to completion, to allow the establishment of a communication link suitable to support the emergency call.

In a variant of the embodiment, the step 60 for estimating the proximity of the UE to the base station is carried out irrespective of the type of call to be implemented. On the other hand, the use of this estimate to inhibit where appropriate an acknowledgement of the access request will not be made unless the call is not an emergency call.

This may be achieved for example by fixing different thresholds depending on the partitions of the PRACH channel. Thus, a very high power threshold may be fixed for the partition corresponding to emergency calls, such that the receive power of the access request by the base station is always less than this threshold and therefore the UE is always considered to be far from the base station. On the other hand, a lower threshold may be used for the other partitions of the PRACH channel to allow distinctive processing of access procedures depending on whether they are made by UEs close to or far from the base station.

The invention claimed is:

1. Method of controlling access of at least one radio terminal to resources of a radio communication network to implement a communication service, the radio communication network comprising at least one base station, the radio terminal being organized to send a first access signal then, when it receives a positive acknowledgement of the first access signal from a base station, a second access signal substantially longer than the said first access signal, resources of the communication network being allocated to the radio terminal after receipt of the said second access signal at the base station, the method comprising:
    receiving at a base station the first access signal sent by a radio terminal;
    detecting, from the first access signal, a type of the communication service requested by the radio terminal; and
    at least one of the following operations, in conditional manner, according to the detected type of the communication service:
        measuring a receive power of the first access signal;
        comparing the measured receive power with a threshold; and
        inhibiting the transmission of a positive acknowledgement of the first access signal to the radio terminal, when the measured receive power is greater than the said threshold; wherein the first access signal is sent by the radio terminal along a partition of a partitioned random access channel, the said partition depending on the requested type of the communication service, in which each partition of the random access channel is characterized by a set of respective access parameters, such as a transmit sub-channel of the random access channel and a signature contained in the first access channel.

2. Method according to claim 1, wherein the first access signal and the second access signal are respectively a preamble and a main portion of one and the same access signal.

3. Method according to claim 1, wherein the inhibition of the transmission of a positive acknowledgement of the first access signal consists at least in the transmission of a negative acknowledgement to the radio terminal.

4. Method according to claim 1, wherein the inhibiting the transmission of the positive acknowledgement of the first access signal to the radio terminal is not executed if the detected type of the communication service is an emergency call.

5. Method according to claim 1, wherein the first access signal is sent by the radio terminal along a partition of the random access channel, based on a correspondence between at least the partitions of the random access channel and the requested type of the communication service, the said correspondence being deduced from information broadcast by the base station.

6. Method according to claim 1, wherein the first access signal is sent by the radio terminal along an identified partition of the random access channel, when the requested type of the communication service is an emergency call.

7. Method according to claim 1, wherein detection of the requested type of the communication service comprises a detection of the partition of the random access channel along which the first access signal is sent by the radio terminal.

8. Method according to claim 7, wherein the threshold with which the measured receive power is compared depends on the detected partition of the random access channel along which the first access signal is sent by the radio terminal.

9. Base station of a radio communication network, comprising:
   means for receiving and positively acknowledging a first access signal from a radio terminal requesting a communication service;
   means for receiving a second access signal substantially longer than the said first access signal, resources of the communication network being allocated to the radio terminal after receipt of the said second access signal at the base station;
   means for detecting, based on a first access signal received from a radio terminal, a type of the communication service requested by the radio terminal;
   means for measuring a receive power of the first access signal;
   means for comparing the measured receive power with a threshold; and
   means for inhibiting the transmission of a positive acknowledgement of the first access signal to the radio terminal, when the measured receive power is greater than the said threshold,
   wherein at least one of the means for measuring, the means for comparing and the means for inhibiting being implemented, in a conditional manner, according to the type of the communication service detected by the means for detecting; wherein the first access signal is sent by the radio terminal along a partition of a partitioned random access channel, the said partition depending on the requested type of the communication service, in which each partition of the random access channel is characterized by a set of respective access parameters, such a transmission sub-channel of the random access channel and a signature contained in the first access signal, and in which the means for receiving the first access signal comprise means for detecting the said partition of the partitioned random access channel along which the first access signal is sent.

10. Base station according to claim 9, wherein the first access signal and the second access signal are respectively a preamble and a main portion of one and the same access signal.

11. Base station according to claim 9, wherein the means for inhibiting the transmission of a positive acknowledgement of the first access signal comprise means for transmitting a negative acknowledgement to the radio terminal.

12. Base station according to claim 9, wherein the means for inhibiting the transmission of a positive acknowledgement of the first access signal to the radio terminal is not activated if the detected type of the communication service is an emergency call.

13. Base station according to claim 9, comprising means for broadcasting information, in which the first access signal is sent by the radio terminal along a partition of the random access channel, based on a correspondence between at least the partitions of the random access channel and the requested type of the communication service, the said correspondence being deduced from the information broadcast by the base station.

14. Base station according to claim 9, wherein the first access signal is sent by the radio terminal along an identified partition of the random access channel, when the requested type of the communication service is an emergency call.

15. Base station according to claim 9, wherein the means for detecting the requested type of the communication service comprise means for detecting the partition of the random access channel along which the first access signal is sent by the radio terminal.

16. Base station according to claim 15, wherein the threshold used by the means for comparing the measured receive power with a threshold depends on the partition detected by the means for detecting the partition of the random access channel along which the first access signal is sent by the radio terminal.

17. A method of controlling access of at least one radio terminal to resources of a radio communication network including at least one base station, the method comprising:
   receiving, at the base station, a first access signal sent by the radio terminal;
   determining, from the first access signal, a type of communication service requested by the radio terminal;
   when the type of communication service is determined to be a first type:
      measuring a receive power of the first access signal;
      comparing the measured receive power with a threshold; and
      inhibiting a transmission of a positive acknowledgement of the first access signal to the radio terminal when the measured receive power is greater than the said threshold; and
   transmitting a positive acknowledgement of the first of the first access signal to the radio terminal if the type of communication service is determined to be a second type.

18. The method of claim 17, wherein the first type corresponds to a standard call and the second type corresponds to an emergency call.

19. The method of claim 1, wherein the type of communication service requested by the radio terminal is one of different types of communication service.

20. The method of claim 19, wherein the type of the communication service is one of standard call and emergency call.

* * * * *

UNITED STATES PATENT AND TRADEMARK OFFICE
CERTIFICATE OF CORRECTION

| | | |
|---|---|---|
| PATENT NO. | : 7,653,016 B2 | Page 1 of 1 |
| APPLICATION NO. | : 10/875823 | |
| DATED | : January 26, 2010 | |
| INVENTOR(S) | : Georgeaux et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1559 days.

Signed and Sealed this

Twenty-eighth Day of December, 2010

David J. Kappos
*Director of the United States Patent and Trademark Office*